United States Patent
Huang

(10) Patent No.: US 8,939,375 B2
(45) Date of Patent: Jan. 27, 2015

(54) MAGNETIC STRIPE READER APPARATUS

(71) Applicant: Askey Computer Corp., New Taipei (TW)

(72) Inventor: Chao-Ching Huang, New Taipei (TW)

(73) Assignee: Askey Computer Corp., New Taipei (TW)

(*) Notice: Subject to any disclaimer, the term of this patent is extended or adjusted under 35 U.S.C. 154(b) by 71 days.

(21) Appl. No.: 13/739,700

(22) Filed: Jan. 11, 2013

(65) Prior Publication Data
US 2014/0084065 A1 Mar. 27, 2014

(30) Foreign Application Priority Data
Sep. 26, 2012 (TW) ............................. 101135384 A

(51) Int. Cl.
*G06K 13/063* (2006.01)
*G06K 7/08* (2006.01)
(52) U.S. Cl.
CPC ................ *G06K 7/082* (2013.01); *G06K 7/084* (2013.01)
USPC ........... 235/484; 235/380; 235/483; 235/486; 235/449

(58) Field of Classification Search
USPC ........................ 235/380, 486, 483, 484, 449
See application file for complete search history.

(56) References Cited

U.S. PATENT DOCUMENTS 5,438,186 A * 8/1995 Nair et al. ..................... 235/449

* cited by examiner

*Primary Examiner* — Kristy A Haupt
(74) *Attorney, Agent, or Firm* — Muncy, Geissler, Olds & Lowe, P.C.

(57) ABSTRACT

A magnetic stripe reader apparatus comprises a first casing, a second casing, a magnetic stripe reader unit, and at least a connecting element. The first casing has an opening, a first positioning portion, and an adjustable fixing portion. The second casing has a second positioning portion disposed corresponding to the first positioning portion, and a through hole disposed corresponding to the adjustable fixing portion. The magnetic stripe reader unit is disposed between the first and second casings, and has a magnetic stripe reader head and a fixing element disposed on a side of the magnetic stripe reader head. In assembly, the connecting element passes through the through hole and connects to the adjustable fixing portion to fix the first and second casings. The second positioning portion and the first positioning portions hold the fixing element, and the magnetic stripe reader head is exposed from the opening.

6 Claims, 5 Drawing Sheets

MAGNETIC STRIPE READER APPARATUS

CROSS REFERENCE TO RELATED APPLICATIONS

This Non-provisional application claims priority under 35 U.S.C. §119(a) on Patent Application No(s). 101135384 filed in Taiwan, Republic of China on Sep. 26, 2012, the entire contents of which are hereby incorporated by reference.

BACKGROUND OF THE INVENTION

1. Field of Invention

The invention relates to a reader apparatus and, in particular, to a magnetic stripe reader apparatus.

2. Related Art

With the development of economics, many kinds of the plastic money are widely presented to the public. The credit card, the debit card, or the card with a magnetic stripe is the most representative of the plastic money.

Accordingly, the magnetic stripe is disposed on a surface of the card, and information is stored by the magnetic stripe. Hence, when the magnetic stripe is read by a magnetic stripe reader (MSR), the system side (such as a bank or a card issuing institution) can immediately know the using condition of the card.

A conventional magnetic stripe reader is composed of an upper casing, a magnetic stripe reader unit and a lower casing. The magnetic stripe reader unit is disposed between the upper and lower casings. The magnetic stripe reader unit is fixed to the lower casing (or the upper casing) by hot melt. When the lower casing and the magnetic stripe reader unit are assembled, a jig is used to help melting the partial material of the casing so as to permanently fix the magnetic stripe reader unit.

If the assembled magnetic stripe reader can not pass the test of the operation functions, it needs to be reworked. However, because the magnetic stripe reader unit has been permanently fixed to the lower casing (or the upper casing) by hot melt, it can not be reworked unless the hot melt junction is removed. However, when the magnetic stripe reader is dismantled, the hot melt junction will be destroyed. Therefore, the original lower casing can not be reassembled with the magnetic stripe unit, but a new lower casing is needed to be assembled with the magnetic stripe reader unit instead, causing the material waste and reducing the production yield, and besides increasing the production time and cost.

Therefore, it is an important subject to provide a magnetic stripe reader apparatus that can be reassembled without the material waste so as to decrease the cost.

SUMMARY OF THE INVENTION

In view of the foregoing subject, an objective of the invention is to provide a magnetic stripe reader apparatus that can be reworked without the material waste so as to decrease the cost.

To achieve the above objective, a magnetic stripe reader apparatus of the invention comprises a first casing, a second casing, a magnetic stripe reader unit and at least a connecting element. The first casing has an opening, at least a first positioning portion, and at least an adjustable fixing portion. The second casing has at least a second positioning portion disposed corresponding to the first positioning portion, and at least a through hole disposed corresponding to the adjustable fixing portion. The magnetic stripe reader unit is disposed between the first casing and the second casing, and has a magnetic stripe reader head and at least a fixing element disposed on at least a side of the magnetic stripe reader head. In assembly, the connecting element passes through the through hole and connects to the adjustable fixing portion to fix the first casing and the second casing. The second positioning portion and the first positioning portion fix the fixing element, and the magnetic stripe reader head is exposed from the opening.

In one embodiment, the first positioning portion and the second positioning portion can be selected from any combination of a protrusion and an indentation, a protrusion and another protrusion, or a protrusion and a flat surface. For example, the first positioning portion is a protrusion, and the second positioning portion is an indentation. Hence, by the cooperation of the protrusion and the indentation, the first and second positioning portions can fix the fixing element so as to fix the magnetic stripe reader unit firmly.

In one embodiment, the fixing element includes at least an adjusting hole, which can be a long hole. Hence, the location of the magnetic stripe reader head coupled with the fixing element can be adjusted by the long hole when the first or second positioning portion passes through the long hole.

In one embodiment, the adjustable fixing portion is a pillar with a blind hole. The connecting element is a screw or a pin. In assembly, the connecting element passes through the through hole and then connects the adjustable fixing portion so as to connect the first and second casings. By adjusting the tightness level between the connecting element and the adjustable fixing portion, the interval between the first and second casings can be adjusted, thereby adjusting the location of the fixing element that is fixed by the first and second positioning portions so as to adjust the magnetic stripe reader head's location.

In one embodiment, the magnetic stripe reader apparatus further comprises a third casing connecting with the first casing and having a sheet element. A sliding recess is formed between the sheet element and the first casing, and connects to the magnetic stripe reader head. Therefore, the magnetic stripe reader head can read out the information stored in the magnetic stripe, when the card with the magnetic stripe slides through the sliding recess and thus the magnetic stripe passes through the magnetic stripe reader head.

In one embodiment, the first positioning portion and the adjustable fixing portion are disposed to the first casing and at each of the opposite sides of the magnetic stripe reader head, and the second positioning portion and the through hole are disposed to the second casing and at each of the opposite sides of the magnetic stripe reader head. Therefore, on the opposite sides of the magnetic stripe reader head, the fixing element can be fixed and the interval between the first and second casings can be adjusted.

As mentioned above, because of the coupling relation between the adjustable fixing portion and the connecting element, and the first and second position portions fixing the fixing element of the magnetic stripe reader unit (not a permanent fixing), the magnetic stripe reader unit (the magnetic stripe reader head) can be reworked easily and repeatedly for finding the best location. Therefore, the material will not be wasted because the fixing is not permanent, and thus the cost can be decreased.

Furthermore, the adjusting hole of the fixing element can be used to adjust the location of the magnetic stripe reader unit (the magnetic stripe reader head), thereby accurately positioning the magnetic stripe reader unit (the magnetic stripe reader head).

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
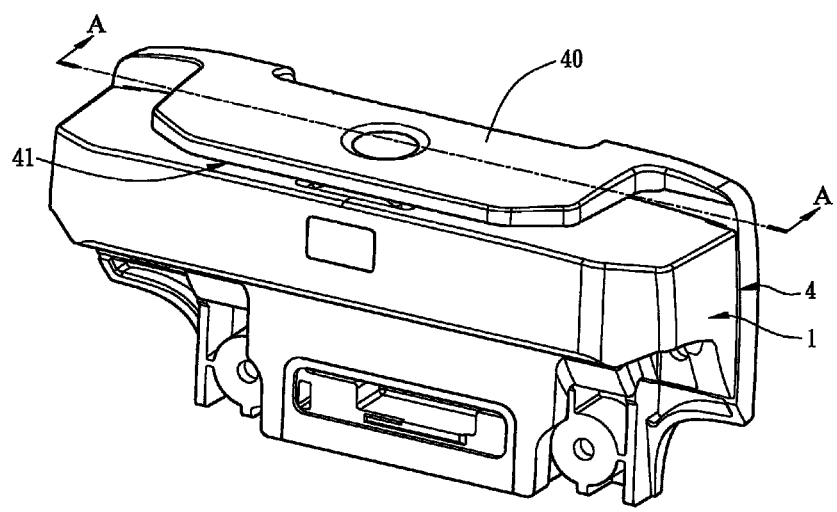
FIG. 1 is a schematic diagram of a magnetic stripe reader apparatus of a preferred embodiment of the invention.
Figure 2:
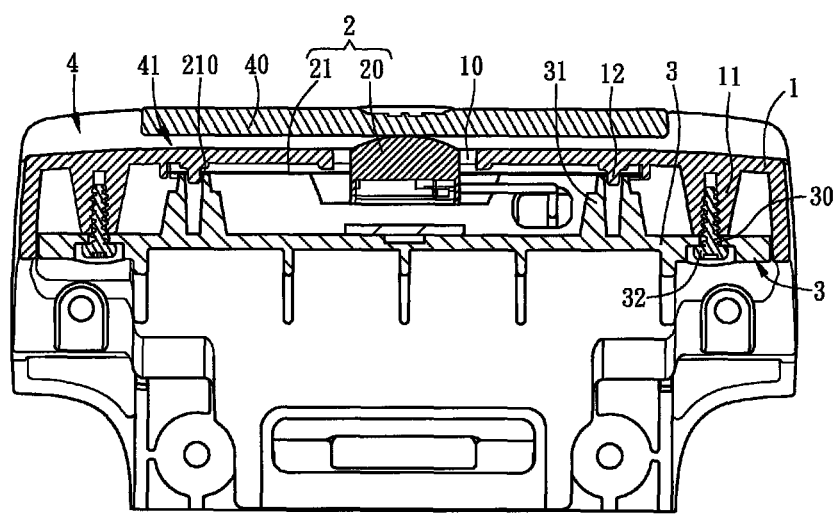
FIG. 2 is a sectional diagram of the magnetic stripe reader apparatus taken along the line A-A in FIG. 1.
Figure 3:
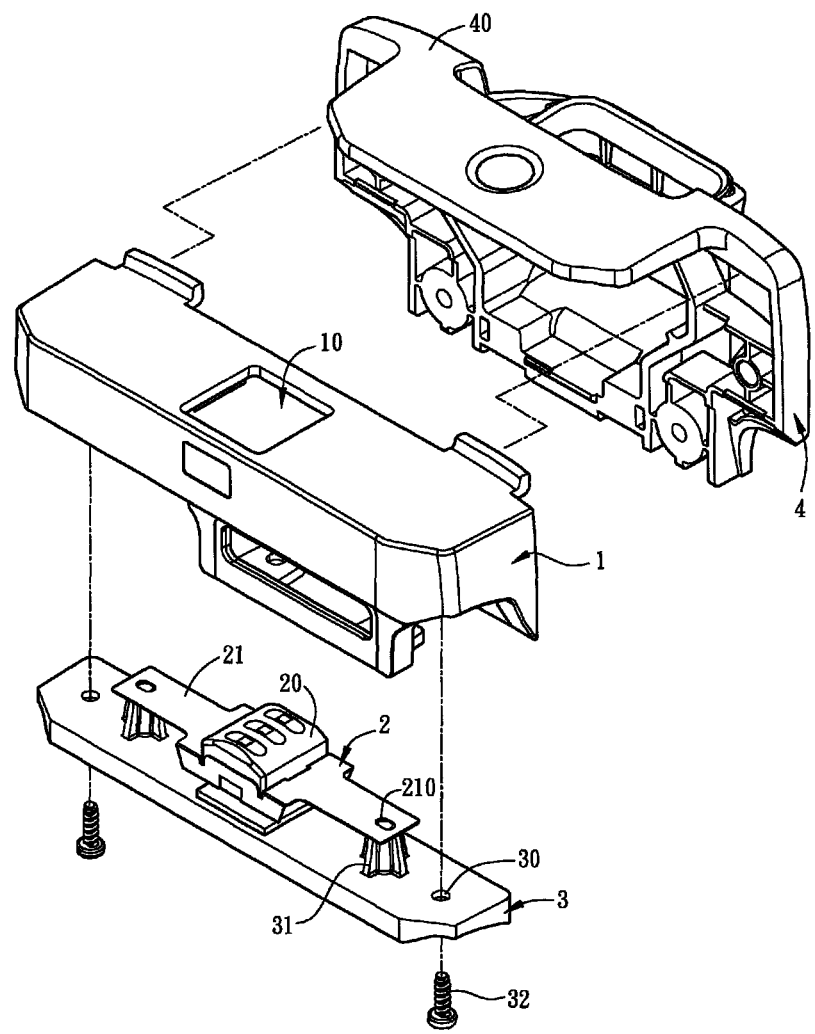
FIG. 3 is an exploded diagram of the magnetic stripe reader apparatus as shown in FIG. 1.

FIG. 1 is a schematic diagram of a magnetic stripe reader apparatus of a preferred embodiment of the invention, FIG. 2 is a sectional diagram of the magnetic stripe reader apparatus taken along the line A-A in FIG. 1, and FIG. 3 is an exploded diagram of the magnetic stripe reader apparatus. Referring FIGS. 1 to 3, the magnetic stripe reader apparatus includes a first casing 1, a magnetic stripe reader unit 2, a second casing 3, and at least a connecting element 32. The connecting element 32 connects the first casing 1 and the second casing 3 so that the magnetic stripe reader unit 2 is disposed between the first casing 1 and the second casing 3.

The magnetic stripe reader unit 2 has a magnetic stripe reader head 20 and at least a fixing element 21. The fixing element 21 is disposed on at least a side of the magnetic stripe reader head 20, and has at least an adjusting hole 210. In this embodiment, the fixing elements 21 are respectively disposed on two sides of the magnetic stripe reader head 20, making the magnetic stripe reader head 20 fixed firmly. The fixing elements 21 have two adjusting holes 210, through which the magnetic stripe reader head 20 can be adjusted in location.

The second casing 3 has at least a through hole 30 and at least a second positioning portion 31. The second positioning portion 31 is disposed corresponding to a first positioning portion 12, and the through hole 30 is disposed corresponding to an adjustable fixing portion 11. The connecting element 32 passes through the through hole 30, and then adjustably connects to the adjustable fixing portion 11 so as to connect and fix the first casing 1 and the second casing 3. The second positioning portion 31 and the first positioning portion 12 fix the fixing element 21. The magnetic stripe reader head 20 is exposed from an opening 10. The connecting element 32 is, for example but not limited to, a screw or a pin.

The magnetic stripe reader apparatus can further include a third casing 4, which is connected with the first casing 1 and has a sheet element 40. A sliding recess 41 is formed between the sheet element 40 and the first casing 1. The sliding recess 41 provides a channel that a card with a magnetic stripe can slide through. The sliding recess 41 connects to the magnetic stripe reader head 20 so that the magnetic stripe reader head 20 can read out the information stored in the magnetic stripe when the magnetic stripe passes through the magnetic stripe reader head 20.

As shown in FIG. 2, the opening 10 is disposed at a side of the first casing 1. At least an adjustable fixing portion 11 and at least a first positioning portion 12 are disposed at an inner side of the first casing 1. The first positioning portion 12 can be disposed near the adjustable fixing portion 11. In this embodiment, a first positioning portion 12 and an adjustable fixing portion 11 are disposed to the first casing 1 and at each of the opposite sides of the magnetic stripe reader head 20. Besides, a second positioning portion 31 and a through hole 30 are disposed to the second casing and at each of the opposite sides of the magnetic stripe reader head 20. The above-mentioned structure is just for example, but not for limiting the scope of the invention. Accordingly, at each of the opposite sides of the magnetic stripe reader head 20, the first positioning portion 12 and the second positioning portion 31 fix the fixing element 21 of the magnetic stripe reader unit 2. To be noted, the connection of the above-mentioned positioning structures is not a permanent type, and that means, the rework can be executed once the connecting element 32 is loosed so that the first casing 1 and the second casing 3 are separated and thus the location of the magnetic stripe reader unit 2 can be adjusted.

Figure 4:
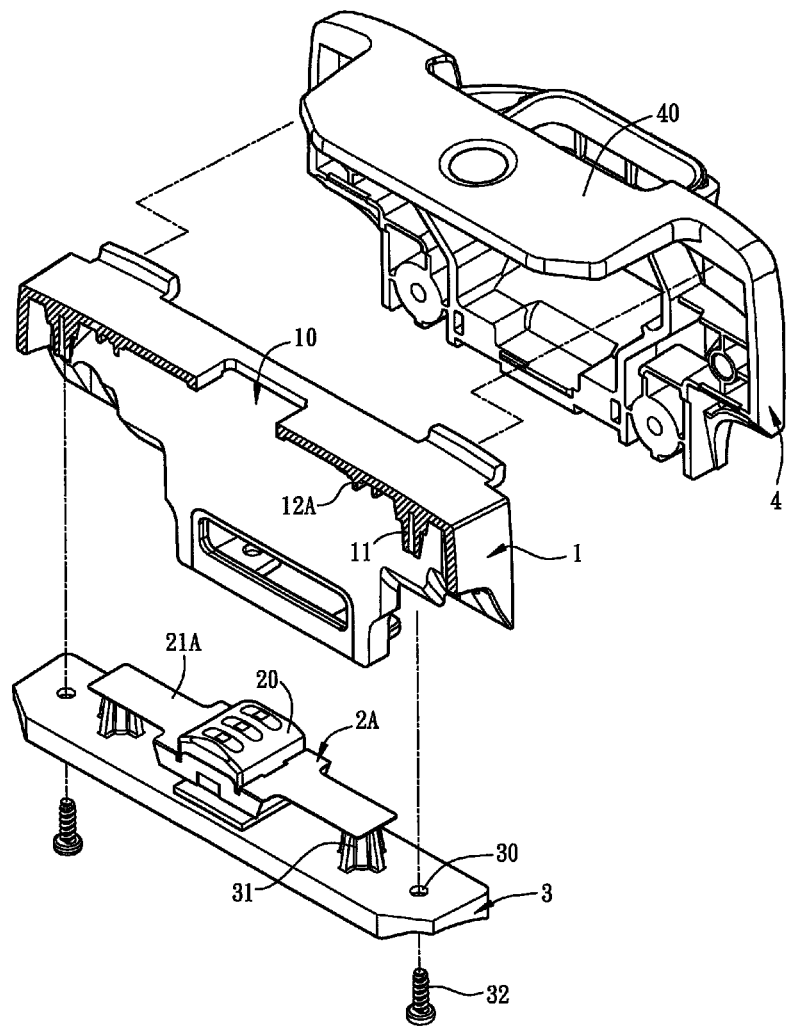
FIG. 4 is an exploded and partial sectional diagram schematically showing a magnetic stripe reader apparatus of another preferred embodiment of the invention.
Figure 5:
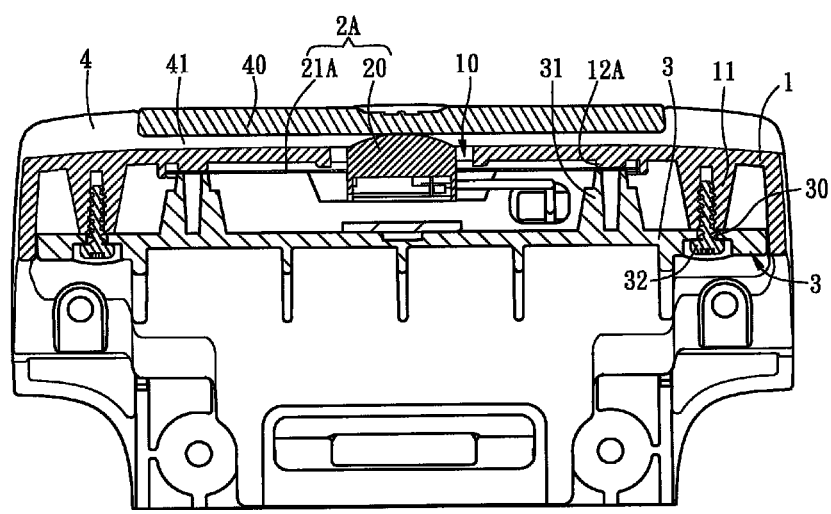
FIG. 5 is a sectional diagram of the magnetic stripe reader apparatus as shown in FIG. 4.

The first positioning portion 12 and the second positioning portion 31 can be any combination of a protrusion and an indentation, a protrusion and another protrusion, or a protrusion and a flat surface. In this embodiment, the first positioning portion 12 is a protrusion (such as a pillar), and the second positioning portion 31 is an indentation. Hence, by the cooperation of the protrusion and the indentation, the first and second positioning portions 12 and 31 can fix the fixing element 21 so as to fix the magnetic stripe reader unit 2 (the magnetic stripe reader head 20) firmly. The above-mentioned structure is just for example, and those skilled in the art can know that the first positioning portion 12 can be an indentation while the second positioning portion 31 is a protrusion (not shown), or that the first positioning portion 12A is a flat surface while the second positioning portion 31 is a protrusion (as shown in FIGS. 4 and 5). Consequently, the structure can be varied according to the principle that the first and second positioning portions fix the fixing element 21 of the magnetic stripe reader unit 2.

Referring to FIGS. 1 and 2 again, the first positioning portion 12 passes through the adjusting hole 210 of the fixing element 21, and then coupled with the second positioning portion 31 so that the magnetic stripe reader head 20 passes through and is thus exposed from the opening 10.

FIGS. 4 and 5 schematically show a magnetic stripe reader apparatus of another preferred embodiment of the invention. In this embodiment, the first casing 1, the opening 10, the adjustable fixing portion 11, the magnetic stripe reader head 20, the fixing element 21A, the second casing 3, the through hole 30, the second positioning portion 31, the connecting element 32, the third casing 4, the sheet element 40, and the sliding recess 41 are illustrated as the above embodiment, so the detailed descriptions thereof are omitted here.

In this embodiment, the first positioning portion 12A is a flat surface, so the fixing element 12A can have no adjusting hole 210 as shown in the above embodiment. Accordingly, when the first casing 1, the magnetic stripe reader unit 2A and the second casing 3 are assembled, the first positioning portion 12A and the second positioning portion 31 are coupled to each other as a combination of a flat surface and a protrusion so as to fix the fixing element 21A so that the magnetic stripe reader unit 2A (the magnetic stripe reader head 20) can be positioned and fixed firmly.

In the invention, the magnetic stripe reader unit 2 can be adjusted in location between the first and second casings 1 and 3 by the coupling relation among the first positioning portion 12, the adjusting hole 210, and the second positioning portion 31. After the location of the magnetic strip reader unit 2 is decided, it can be fixed between the first and second casings 1 and 3 by the coupling relation between the connecting element 32 and the adjustable fixing portion 11. Finally, the first and second casings 1 and 3 that have been assembled together can be assembled with third casing 4 to finish the assembly of the magnetic stripe reader apparatus. Afterward, if the magnetic stripe reader head 20 is unable or not easy to read the magnetic stripe and thus needs to be reworked, the magnetic stripe reader unit 2 is easy to be adjusted in location because the connecting element 32 and the adjustable fixing portion 11 can be easily loosed. When the magnetic stripe reader unit 2 is adjusted to the best location, it can be fixed again by executing the above-mentioned assembly steps.

In summary, because of the coupling relation between the adjustable fixing portion and the connecting element, and the first and second position portions fixing the fixing element of the magnetic stripe reader unit (not a permanent fixing), the magnetic stripe reader unit (the magnetic stripe reader head) can be reworked easily and repeatedly for finding the best location. Therefore, the material will not be wasted because the fixing is not permanent, and thus the cost can be decreased.

Furthermore, the adjusting hole of the fixing element can be used to adjust the location of the magnetic stripe reader unit (the magnetic stripe reader head), thereby accurately positioning the magnetic stripe reader unit (the magnetic stripe reader head).

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A magnetic stripe reader apparatus, comprising:
   a first casing comprising an opening, at least a first positioning portion and at least an adjustable fixing portion;
   a second casing comprising at least a second positioning portion disposed corresponding to the first positioning portion, and at least a through hole disposed corresponding to the adjustable fixing portion;
   a magnetic stripe reader unit disposed between the first casing and the second casing, and comprising a magnetic stripe reader head and at least a fixing element disposed on at least a side of the magnetic stripe reader head;
   at least a connecting element passing through the through hole and connecting to the adjustable fixing portion to fix the first casing and the second casing, wherein the second positioning portion and the first positioning portion fix the fixing element, and the magnetic stripe reader head is exposed from the opening; and
   a third casing connecting with the first casing and having a sheet element, wherein a sliding recess is formed between the sheet element and the first casing, and connects to the magnetic stripe reader head.

2. The magnetic stripe reader apparatus as recited in claim 1, wherein the fixing element includes at least an adjusting hole, and the first positioning portion or the second positioning portion passes through the adjusting hole.

3. The magnetic stripe reader apparatus as recited in claim 1, wherein the first positioning portion and the second positioning portion are from any combination of a protrusion and an indentation, a protrusion and another protrusion, or a protrusion and a flat surface.

4. The magnetic stripe reader apparatus as recited in claim 1, wherein the adjustable fixing portion is a pillar with a blind hole.

5. The magnetic stripe reader apparatus as recited in claim 1, wherein the connecting element is a screw or a pin.

6. The magnetic stripe reader apparatus as recited in claim 1, wherein the first positioning portion and the adjustable fixing portion are disposed to the first casing and at each of the opposite sides of the magnetic stripe reader head, and the second positioning portion and the through hole are disposed to the second casing and at each of the opposite sides of the magnetic stripe reader head.

\* \* \* \* \*